United States Patent

Greason, III et al.

[15] 3,697,700

[45] Oct. 10, 1972

[54] LINE HUNTING CIRCUITRY FOR COMMON CONTROL COMMUNICATIONS SWITCHING SYSTEM

[72] Inventors: William Wallace Greason, III, Longmont; David William Weiner, Boulder, both of Colo.

[73] Assignee: Bell Telephone Laboratories, Incorporated, Murray Hill, N.J.

[22] Filed: Dec. 21, 1970

[21] Appl. No.: 100,315

[52] U.S. Cl. ..........................179/18 AB, 179/18 AD

[51] Int. Cl. ..............................................H04q 3/22

[58] Field of Search.......179/18 AD, 18 AB, 18 FG, 179/27 CA, 27 D

[56] References Cited

UNITED STATES PATENTS

| | | | |
|---|---|---|---|
| 3,377,432 | 4/1968 | Abbott et al. | 179/18 FH |
| 3,275,754 | 9/1966 | Howell et al. | 179/18 HA |

*Primary Examiner*—Thomas W. Brown
*Attorney*—R. J. Guenther and James Warren Falk

[57] ABSTRACT

A telephone system suitable for use as a private branch exchange with 40 station and attendant lines or less is disclosed. It comprises a crossbar switching network that establishes call connections for station lines, registers and trunks under common control. PBX line hunting circuitry is integrated into the electromechanical switching network with electronic hunting gate arrangements in a group of station line circuits.

8 Claims, 4 Drawing Figures

INVENTORS W. W. GREASON, III
D. W. WEINER
BY Frederick W. Padden
ATTORNEY

LINE HUNTING CIRCUITRY FOR COMMON CONTROL COMMUNICATIONS SWITCHING SYSTEM

BACKGROUND OF THE INVENTION

This invention relates to communication systems and particularly to circuitry for hunting in a group of station lines to select an idle line for answering a call when that call is initially directed to a busy one of the lines.

A substantial percentage of telephone customers served by small switching systems, such as private branch exchanges, have indicated in recent years that their main interest is in the automatic switching of local intercom and outgoing calls. To a lesser degree, such customers have proven to be interested in other sophisticated service features, such as PBX line hunting, but only when such features are offered at economically attractive rates. A problem in the prior art is that relatively complex and expensive equipments have heretofore been needed for the line hunting service in switching systems serving, for example, as private branch exchanges.

SUMMARY OF THE INVENTION

In accordance with principles of our invention, a solution to the foregoing problem is achieved by providing illustrative line hunting equipment which comprises simple and economical gate circuitry for processing a busy called line signal through a group of PBX line circuits until a first idle one of the circuits is found. Specifically, a group of line circuits is equipped for line hunting by providing each such circuit with a hunt gate which receives a line busy signal from a preceding line circuit when the latter circuit is addressed and found busy. The hunt gate controls a busy-idle status gate in cooperation with a hold gate to pass an idle line identifying signal through a switching network to a common control circuit upon the addressing of a called and busy preceding line. According to a feature of our invention, the hold gate is activated by the common control to lock idle line hunting at the first idle line circuit in the hunting group.

Another feature of our illustrative hunting circuitry is the integration of a hunting chain arrangement into the switching network for steering line busy signals in an ordered sequence among line circuits of a hunting group. To elaborate, our illustrative embodiment provides contact configurations of crossbar switch hold magnets in the switching network and crossconnections in a service connection field for steering the line busy and idle signals. The service connection field crossconnections enable line hunting flexibility such that hunting need not be between successively assigned station numbers in the system.

DESCRIPTION OF THE DRAWING

The foregoing and other objects and features of this invention will become apparent from a reading of the following description of an illustrative embodiment of our invention taken in conjunction with the drawing in which.

Figure 3:
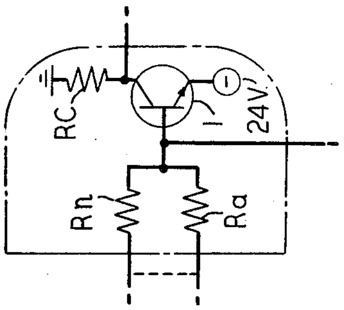
FIG. 3 illustrates the basic transistor-resistor logic circuit that is utilized in the line circuit or FIG. 2 as a gate.
Figure 4:
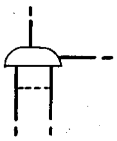
FIG. 4 illustrates the symbolization used for the circuit of FIG. 3.

The transistor-resistor logic circuit depicted in FIG. 3 comprises a single NPN transistor 1, a collector resistor RC and a plurality of input resistors $Ra$–$Rn$ of which there is one for each input to the stage. The circuit of FIG. 3 is basically a single stage inverter since a positive signal hereinafter referred to as a HIGH applied to the base appears as a negative signal hereinafter referred to as a LOW at the collector and vice versa.

The stage may be used as an inverting OR gate by leaving the circuit normally "OFF," that is, with all inputs LOW ($-v$). In this case, a HIGH signal applied to one or more of the input leads will turn the transistor "ON" and provide a LOW signal on the collector. The stage may also be used as an inverting AND gate in which case the transistor is normally held "ON" by a HIGH signal applied to one or more of its input leads. The AND condition of the circuit is achieved by a LOW potential on all input leads at which time the transistor turns "OFF" and produces a HIGH signal at its output.

Figure 1:
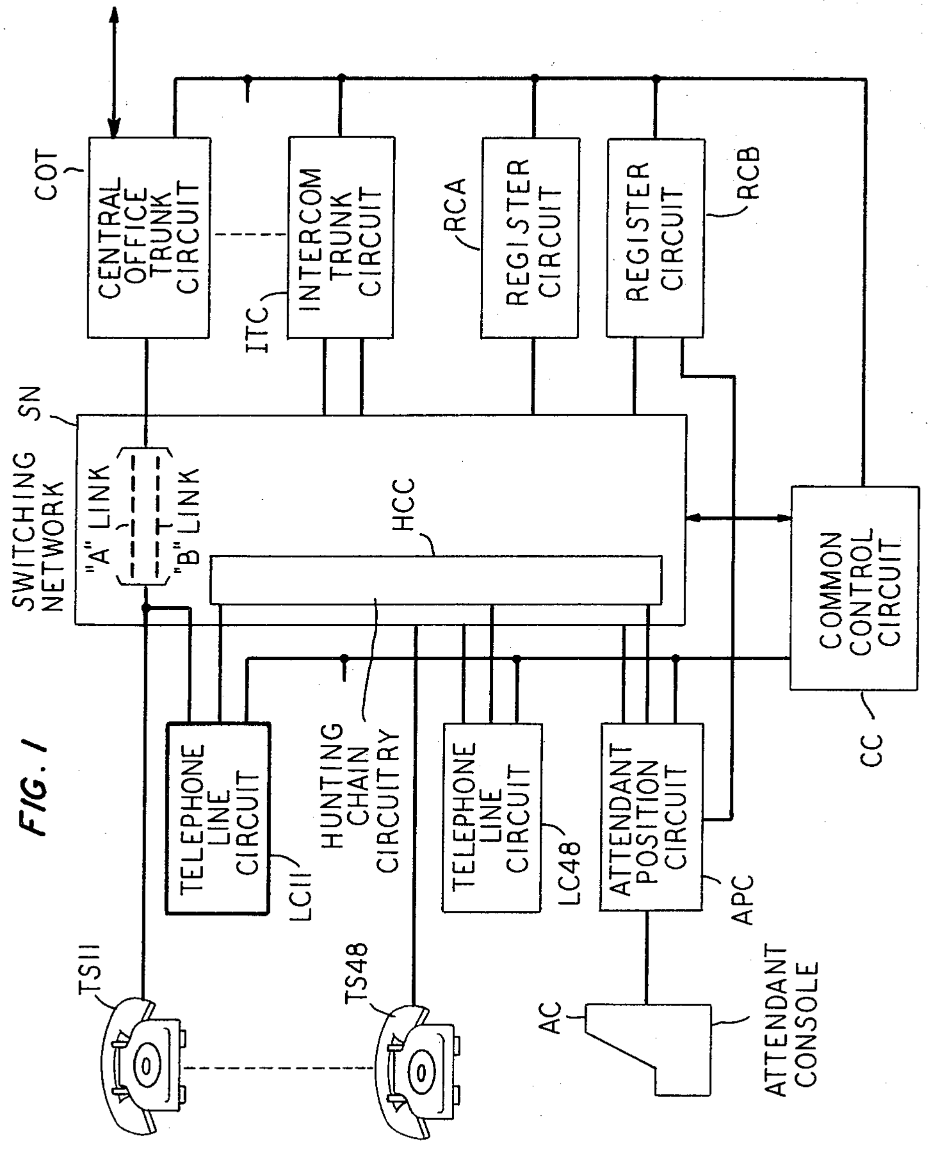
FIG. 1 comprises a block diagram of a telephone system comprising the present invention.

It is noted that the invention is particularly concerned with structural details of the line circuit shown in the heavy line block of FIG. 1 and with parts of the switching network. The detailed design of the other circuit units form no part of the present invention and are therefore neither shown nor described in detail herein except where necessary for a complete understanding of the present invention. For example, the switching network is illustratively a conventional six-wire crossbar switch network with known "A" and "B" link arrangements.

GENERAL DESCRIPTION

The telephone system as disclosed in FIG. 1 is particularly suitable for use as a small private branch exchange which includes a plurality of telephone stations TS11–TS48, each of which is connected to a correspondingly numbered one of the line circuits LC11–LC48 via a switching network SN. Each of the line circuits is additionally connected to a common control circuit CC. Network SN provides "A" and "B" links for call connections and also terminates a number of trunk circuits such as central office trunk circuit COT, intercom trunk circuit ITC, registers RCA and RCB, and an attendant position circuit APC to an attendant console AC. The common control circuit CC regulates and coordinates the operation of every circuit in the system during the serving of calls and accordingly it is connected to the line circuits, switching network, registers and the various trunk circuits.

The present invention is particularly concerned with the line hunting structure and operations involving the line circuits LC11–LC48, network SN and the control circuit CC as related to calls terminating at one of the stations TS11–TS48. The remainder of the circuit operations are not needed for a complete understanding of our invention and therefore are not described in detail. A terminating call received, for example, in trunk circuit COT from a central office results in the operation of the common control CC whereby the address of the called station such as station TS11 is stored in control circuit CC. The latter circuit then enables all line circuits, but addresses only the called one of them to ascertain whether it is busy or idle. When the called station is idle, the associated line circuit sends an idle status signal to the common control CC via network SN. The control circuit CC then proceeds to establish connections through network SN between the called line circuit LC11 and trunk circuit COT.

If the called station is busy, the associated line circuit cooperates with the network SN to inform the control circuit CC of the busy status and to initiate through hunting chain circuitry HCC of network SN a hunting operation for the first succeeding idle line circuit within the same hunting group. When such an idle circuit is found, the hunting circuitry cooperates with the common control circuit CC according to our invention to lock the hunting operation at that line circuit and to inform control circuit CC of the idle line status. The control circuit CC, upon receiving a busy status signal from the called line circuit and an idle status signal from the first idle succeeding line circuit, controls the establishment of connections through network SN over an "A" or "B" link between the idle line circuit and trunk circuit COT.

DETAILED DESCRIPTION

Figure 2:
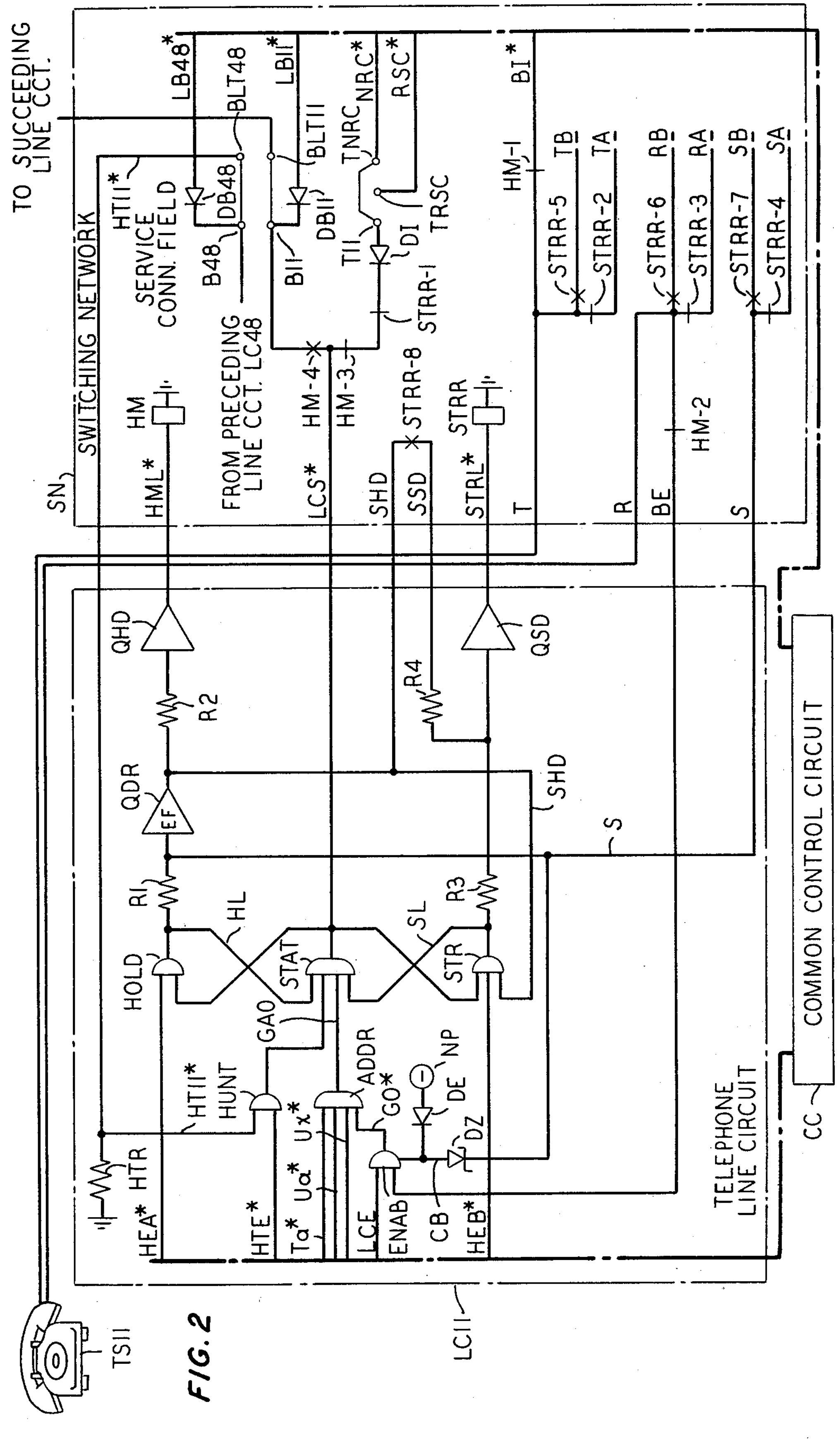
FIG. 2 is a schematic diagram of the basic line circuit including the line hunting circuitry.

Turning now to FIG. 2, the specific illustrative structure and operation of our line hunting circuitry is described with reference to line circuit LC11. Telephone station TS11 is connected over tip and ring leads T and R to switching network SN. Tip lead T is extended through network SN to common control circuit CC for service request enabling via an off-normal contact HM-1 of a conventional crossbar switch hold magnet and lead BI*. Ring lead R is connected through network SN to line circuit LC11 via lead BE and another off-normal contact HM-2. When station TS11 is on-hook, tip and ring leads T and R are opened and no call connections exist through network SN to the tip, ring and sleeve leads T, R and S for station TS11.

An enable gate ENAB of circuit LC11 is connected to lead BE for detecting service requests from station TS11. Gate ENAB is also advantageously connected to sleeve lead S and a Zener diode arrangement for callback operations. For service request and callback scanning as well as terminating call operations, gate ENAB is connected to common control circuit CC via a line circuit enable lead LCE which is multipled to all other line circuits LC12–LC48. An output lead GO* of gate ENAB is connected as an input to an address gate ADDR of line circuit LC11.

Gate ADDR cooperates with the common control CC and other circuits of the system to perform service request, callback and terminating call address scanning. It receives individual station line address signals from circuit CC via conductors Ta*, Ua* and Ux*. Conductor Ta* is multipled to all line circuits in the same "tens" group, which for line circuit LC11 is the line circuits LC11–LC19. Conductors Ua* and UX* are multipled to all other line circuits sharing the same units digit. Thus, for line circuit LC11, all line circuits having the same "1" units digit are multiple connected to the conductors U*a** and U*x**. An output lead GAO is connected to an input to a status gate STAT and generates a control signal indicating the identity of the line circuit when the gate ADDR is fully enabled.

The gate STAT is utilized to supply the common control CC with information as to the busy-idle and callback status of an associated line during address operations. Specifically, during service request scanning and terminating call addressing, gate STAT receives a single input signal from gate ADDR for supplying an output status signal to lead LCS* which is passed to control circuit CC via network SN. The output signals pass through network SN via a hold magnet off-normal contact HM-3 and a steering relay contact STRR-1 and diode DI to terminal T11 of a service connection field. The latter comprises terminals for appropriate crossconnections illustratively for class-of-service and PBX line hunting. By way of example, class-of-service crossconnections are made for line circuit LC11 between terminal T11 and a nonrestricted class-of-service terminal TNRC associated with conductor NRC* to the common control CC. Terminal TRSC in the crossconnection field is used for restricted class-of-service which illustratively limits a station to intercom and attendant calls.

In accordance with an aspect of our invention, PBX line hunting service is advantageously provided by equipping each line circuit in a hunting group with an individual gate HUNT. Each such gate is multiple connected to a hunt enable lead HTE* from the common control CC. The common lead HTE* is addressed by circuit CC to partially control all HUNT gates in the system when a call is processed for termination to a line circuit. If the desired called line is busy and it is equipped for line hunting by crossconnections in the service connection field, the first idle succeeding line circuit in the group is selected for receiving the call. To do so, each HUNT gate is also equipped with one of the input leads HT11*–HT48* which is crossconnected in the service connection field of network SN to a line busy terminal associated with a preceding line circuit in the same hunting group. Illustratively, lead HT11* of circuit LC11 is crossconnected via terminal BLT48 to terminal B48 associated with line circuit LC48 of station TS48 for supplying a line hunting signal to terminal BLT48 when a terminating call is directed to circuit LC48 and it is busy. Similarly, circuit LC11 supplies a busy line hunting signal to a succeeding one of the other line circuits (not shown) from its gate STAT to terminal B11 of network SN via its associated hold magnet off-normal contact HM-4 and lead LCS*. The output of the hunt gate is supplied as an input to gate STAT to control the generation of busy-idle line hunting signals. The foregoing contact configurations and service connection field crossconnections comprise the hunting chain circuitry HCC depicted in FIG. 1.

Gate HOLD is functionally interrelated with the common control circuit operations for controlling the actuation of a crossbar switch hold magnet HM in network SN to establish call connections. Typically, the common control first determines the busy-idle status of a line circuit in call processing by monitoring of gate STAT. Thereafter, the common control applies a control signal to lead HEA* which operates with a signal from gate STAT to enable gate HOLD. The latter gate, when enabled, drives amplifiers QDR and QHD to operate hold magnet HM and locks the state of gate STAT. In accordance with our illustrative circuitry, the gate HOLD locking of gate STAT is advantageously utilized on PBX line hunting to hold the identity of the idle line in a hunting group when hunting is stopped by the common control CC.

Gate STR is used illustratively in combination with a steering relay STRR and amplifier QSD to steer the tip, ring and sleeve leads to "A" and "B" 3-wire links through network SN.

Idle Condition

During the idle condition of circuit LC11, station TS11 is on-hook and the common control circuit CC processes calls through other of the line and attendant circuits of the system. In doing so, it applies line scanning and other call processing signals to leads which are multiple in common to a plurality of the line circuits LC11–LC48. These leads include, for example, the common tens and units address leads *Ta**, *Ua** and *Ux** and the common line circuit enable lead LCE, as well as the hunt and hold enable leads HTE* and HEA*, leads BI* and HEB*.

Before describing the switching state of various gates in circuit LC11 as controlled by circuit CC, it is beneficial to review that the output of an OFF gate is referred to as a "HIGH" and illustratively is several volts above −24 volts. In a similar fashion, the output of an ON gate is referred to as "LOW" and is illustratively −24 volts.

When the control circuit CC is also idle, it applies a LOW to the line circuit enable lead LCE for switching gate ENAB OFF and in turn holding gate ADDR ON. At the same time, the address leads *Ta**, *Ua** and *Ux** are held HIGH in the absence of call process addressing operations. The idle control circuit CC also holds leads HEB*, BI*, HTE* and HEA* HIGH. All inputs to gate STAT are therefore LOW for indicating the idle condition of station TS11 and control circuit CC. Thus, gate STAT is OFF and it holds a HIGH on lead LCS*. In summary, during the idle condition of circuit LC11, the leads having a * symbol following the lead designation have a HIGH thereon and all other leads of circuit LC11 have a LOW thereon.

Terminating Call

Connections through network SN are established for a terminating call between a called one of the line circuits LC11–LC48 and a central office trunk circuit COT or an intercom trunk circuit ITC under control of a common control circuit CC. Illustratively, after an incoming call from a central office is received on trunk circuit COT for a station TS11, circuit CC is effective to control the completion of call connections for enabling all line circuits LC11–LC48 by applying a HIGH to lead LCE of FIG. 2. As a result, the ENAB gates in all line circuits LC11–LC48 turn ON for enabling their associated address gates ADDR. The control circuit CC next applies the address of the called station TS11 to the address leads *Ta**, *Ua** and *Ux** of the line circuit LC11. This address is in the form of LOW signals on the three preaddress leads of only the called line circuit LC11. Consequently, its gate ADDR of FIG. 2 is switched OFF for, in turn, switching gate STAT of FIG. 2 ON and thereby applying a LOW to lead LCS*.

When line circuit LC11 is idle, the LOW on lead LCS* is propagated through the switching network SN to the control circuit CC for informing it of the idle status. The LOW on lead LCS* is propagated via contacts HM-3 and STRR-1, diode DI, crossconnections in the service connection field and lead NRC*. After receiving the LOW on lead NRC*, the common control CC activates line circuit LC11 as hereinafter described to complete call connections through network SN to trunk circuit OTC.

On the other hand, when the called station TS11 is busy, the LOW on lead LCS* is extended through contact HM-4, terminal B11 of the crossconnection field, and diode DB11 to lead LB11 for informing the control circuit CC of the busy status. If circuit LC11 is not arranged for line hunting service, the common control circuit CC causes a busy signal to be returned to the calling station in a known manner immediately after the receipt of a line busy signal on lead LB11. Control circuit CC then releases itself and circuit LC11 from the call.

In accordance with our invention, line hunting service is advantageously provided for line circuit LC11 by crossconnecting terminal B11 to a hunt terminal in the service connection field which hunt terminal is associated with another of the line circuits LC12–LC48. Such a cross connection allows the LOW signal on lead LCS* of a busy line circuit LC11 to be extended through the HM hold magnet contact HM-4 and terminal B11 to the next succeeding line circuit in the hunting group. At this point, it is advantageous for disclosure simplicity particularly in the drawing to explain the hunting operations by departing from the assumption that the call on trunk circuit COT is being directed to station TS11 and assume instead that it is being directed to station TS48. Further assume that the line circuit LC11 is the next succeeding circuit in the hunting group to be tested and selected for receiving the call directed to station TS48 when it is busy. Under such circumstances, the common control CC and line circuit LC48 operate as already described to apply a LOW to terminal B48 in the service connection field. This LOW is so applied in essentially the same manner as described with regard to circuit LC11 and via an individual lead LCS* (not shown) for circuit LC48 and the crossbar switch hold magnet off-normal make contact (not shown) associated with the circuit LC48. The LOW on terminal B48 is extended by a line hunting crossconnection to terminal BLT48 and thence over lead HT11* to line circuit LC11.

For line hunting operations, control circuit CC applies a hunting signal, a LOW, on lead HTE* to all line circuits LC11–LC48 but this signal has no effect at that time because of the HIGH supplied to the individual leads HT11*–HT48* of all line circuits by a resistor HTR in the latter circuits. The coincident LOW signals on leads HT11* and HTE* for a call to the busy line circuit LC48, turn OFF the gate HUNT and thereby switches gate STAT ON. The latter gate thereupon applies a LOW to lead LCS* for determining the busy-idle status of circuit LC11. If it is busy, the LOW on lead LCS* is extended via contact HM-4 and terminal B11 to the next succeeding line circuit in the chain of line circuits in the same hunting group for a continuance of the idle line hunting operations. In the event that there is no idle line circuit in a hunting group for serving the call to station TS48, the common control CC is informed of this fact by a LOW on lead LCS* for each line circuit in that group which LOW is extended to the circuit CC through the hold magnet off-Normal contacts associated with each line circuit in the network SN. Control circuit CC then causes a busy signal to be returned in a known manner to the calling station.

However, if circuit LC11 is idle, the LOW on lead LCS* is extended to the control circuit CC via contacts HM-3 and STRR-1, diode DI, and terminals T11 and TNRC to lead NRC*. Accordingly, the control circuit CC by receiving LOW signals on lead NRC* for circuit LC11 and lead LB48 for busy circuit LC48 in a manner as priorly explained, is informed that the called station TS48 is busy and that the call is to be completed to the idle station TS11 via circuit LC11.

Trunk Circuit to Station Connection

Control circuit CC is ascertaining that the received call is to be connected to station TS11 obtains information from trunk circuit COT as to whether it is a steered or nonsteered circuit. A steered circuit illustratively uses a three-wire level "B" link of a six-wire crossbar switch network SN while a nonsteered circuit uses the other three-wire level "A" link of the six-wire switch network. Information on the steered or nonsteered status of a trunk circuit is needed so that the line circuit can control the operation of relay STRR for switching the tip and ring leads T and R of station TS11 and the associated sleeve lead S to the "A" or "B" level links.

If trunk circuit COT is a nonsteered circuit, control circuit CC causes a sequence of operations which result in the operation of a network SN to interconnect line circuit LC11 with circuit COT over an "A" link. The operation is initiated by circuit CC making lead HEA* LOW to switch gate HOLD OFF for driving amplifiers QDR and QHD via resistors R1 and R2 to effect the operation of the crossbar switch hold magnet HM.

In operating, magnet HM activates network SN in a known manner to establish tip, ring and sleeve connections from circuit COT to circuit LC11 and station TS11. The latter station is connected over leads T and R and contacts STRR-2 and STRR-3 to the SN network tip and ring leads TA and RA of an "A" link. Circuit LC11 is connected via sleeve S and contact STRR-4 to the SN network sleeve SA of the same "A" link. The nonsteered trunk circuit COT then transmits in a known manner a HIGH through network SN to lead S for holding amplifiers QDR and QHD ON and thereby maintaining magnet HM operated for the remainder of the call.

On the other hand, if trunk circuit COT is a steered circuit, the common control CC after being informed of the steered status, proceeds to control the operation of relay STRR before the operation of magnet HM. To do so, the common control CC switches lead HEB* LOW. The latter signal in coincidence with the emitter-follower QDR OFF and gate STAT ON causes gate STR to turn OFF for, in turn, driving amplifier QSD via resistor R3 to operate relay STRR. In operating, relay STRR switches the tip and ring leads T and R of station TS11 from leads TA and RA to leads TB and RB via contacts STRR-5 and STRR-6. Lead S to circuit LC11 is also switched from lead SA to SB via contacts STRR-7. Operated relay STRR also informs the common control CC of its operation by opening contact STRR-1 to remove the LOW from lead NRC*. Next, the control circuit CC switches lead HEA* LOW to turn OFF gate HOLD and in turn activate amplifier QDR to hold amplifier QSD ON via lead SHD, contact STRR-8, lead SSD and resistor R4. The activated amplifier QDR output HIGH also turns ON gate STR via lead SHD and drives amplifier QHD for operating the hold magnet HM to complete hold connections between circuits LC11 and COT.

An important aspect of our illustrative embodiment is that the line hunting is stopped upon the finding of the first idle line circuit in a hunting group and this is done after the LOW signal command on lead HEA* or HEB*. The hunt stopping is needed because the common control must break the hunting chain by reapplying a HIGH to lead HTE* before the hold magnet operates. If the hunt stopping command, a HIGH on lead HTE*, were not initiated, the busy LOW signal extended from lead LCS* to lead LB11* would also be extended from terminal B11 to the next succeeding line circuit in the same hunting group to continue line hunting. In response to the HEA* or HEB* LOW signal, the states of gates in circuit LC11 are locked and maintained by the output of gate HOLD or STR holding the status gate STAT ON via feedback locking leads HL or SL.

The operation of magnet HM as priorly described opens contact HM-2 to disconnect line circuit LC11 from the tip lead R. Activated contact HM-1 also disconnects lead BI* from the tip lead. As a result, the telephone line circuit for station TS11 is completely disconnected from the voice transmission path. The operation of contact HM-4 informs the common control CC that the connection between station TS11 and trunk circuit COT has been established. Specifically, contact HM-4 does so by switching the LOW on lead LCS* to lead LB11* via terminal B11 and diode DB11. Circuit CC thereafter switches lead LCE LOW to turn OFF all of the gates ENAB which then switches gate ADDR (not shown) ON in the line circuit LC48.

Station TS11 is now connected through network SN to trunk circuit COT which maintains the network connection by holding the hold magnet HM operated as well as relay STRR (for a steered trunk circuit) by the HIGH on sleeve lead S as priorly explained. Thereafter, circuit CC returns leads BI*, HEA*, HEB*, *Ua**, *Ux** and *Ta** to their idle HIGH state for switching gate STAT OFF, and thereby making lead LCS* HIGH. Line circuit LC11 thereafter is held engaged on the call connections by a HIGH on sleeve lead S from circuit COT for the duration of the call.

It is to be understood that the above described arrangements are illustrative of the application of principles of this invention. In light of our teaching, it is apparent that numerous other arrangements may be devised by those skilled in the art without departing from the spirit and scope of the invention.

Reference is made to the patent application Ser. No. 100,314 of W. W. Greason III and D. W. Weiner entitled Communication Line Circuitry filed concurrently with this application wherein a related invention is described.

What is claimed is:

1. A line circuit for a communication system having common control means, which system includes an ordered sequence of line circuits and means for addressing said line circuits, said line circuit comprising a status gate operable to indicate the busy-idle status of said circuit to said common control means, an address gate responsive to a receipt of address signals from said addressing means for activating said status gate to transmit a busy signal to a subsequent one of said line circuits in said sequence when said circuit is busy, and a hunt gate responsive to a receipt of a busy signal from a preceding one of said line circuits in said sequence for operating said status gate to supply an idle signal to said common control means when said line circuit is idle.

2. A line circuit in accordance with claim 1 further comprising a hold gate responsive to a receipt of a control signal from said common control means for maintaining said status gate operated following its operation by said hunt gate.

3. In a telephone system having a plurality of line circuits, a switching network operable for establishing terminating call connections to said circuits, common control means responsive to a receipt of a terminating call for any of said circuits for operating said network to establish call connections to the called one of said circuits and for supplying signals for addressing said circuits, and each one of said circuits comprising a status gate for indicating the busy-idle status of said one circuit, an address gate responsive to a receipt of said addressing signals for activating said status gate to generate a hunting signal when said one circuit is busy, wherein the improvement comprises a hunt gate controlled by said control means and a generated hunting signal from a status gate of another one of said line circuits for operating said status gate of said one of said circuits to supply an idle signal to said control means for said one of said circuits.

4. The invention according to claim 3, wherein the improvement further comprises a hold gate activated by said control means for controlling said status gate of said one of said circuits to lock said status gate operated following its operation by said hunt gate, thereby maintaining said idle signal supplied to said control means and said hunt gate is responsive to a hunting stop signal from said control means for stopping idle line hunting at said one of said circuits.

5. The invention according to claim 4, wherein said switching network includes means for connecting a hunting signal from a called busy one of said line circuits to a succeeding one of said line circuits.

6. The invention according to claim 5, wherein said switching network further includes means for connecting busy and idle signals from said line circuits to said common control means, and said common control means cooperates with said busy-idle signals connecting means in response to a receipt of busy signal for said called busy one of said line circuits and a concurrent receipt of an idle signal for said succeeding one of said line circuits for controlling the operation of said switching network to establish terminating call connections to said succeeding one of said line circuits instead of said called busy one of said line circuits.

7. A communications switching system comprising a plurality of line circuits, said line circuits being arranged in a sequence, a switching network, common control means directable to examine said line circuits to determine the idle or busy status thereof and to control said switching network to establish terminating call connections to said line circuits, conditionable gating means associated with each one of said line circuits responsive to the busy status of a preceding line circuit in said sequence for directing said common control means to examine said one of said line circuits, first means associated with said switching network responsive to a busy status of said one of said line circuits for rendering said common control means directable to examine a succeeding line circuit in said sequence, said first means also being responsive to an idle status of said one of said line circuits to direct said common control means to control said switching network to establish communication connections to said one of said line circuits, and second means associated with said switching network responsive to said busy status of said one of said line circuits for conditioning said gating means of a succeeding one of said line circuits.

8. A communications switching system according to claim 7 wherein said second means associated with said switching network includes means for selectively cross connecting said line circuits in a predeterminable sequence.

* * * * *